United States Patent [19]

Marecaux

[11] 3,855,076

[45] Dec. 17, 1974

[54] PROCESS AND DEVICE FOR PURIFICATION OF EFFLUENTS CONTAINING PHENOLS AND AMMONIUM SALTS

[75] Inventor: Paul Marecaux, Ville d'Avray, France

[73] Assignee: Societe Pour L'Equipment Des Industries Chimiques Speichim, Paris, France

[22] Filed: June 6, 1973

[21] Appl. No.: 367,511

[30] Foreign Application Priority Data
June 12, 1972 France .............................. 72.21047

[52] U.S. Cl. ............. 203/11, 159/16 S, 159/17 VS, 159/47 WL, 202/174, 203/37, 210/59, 210/152, 260/627 G
[51] Int. Cl. ........ B01d 3/00, B01d 1/00, B01d 1/14, B01d 1/26
[58] Field of Search ...... 23/260, 262, 263; 159/4 A, 159/47 WL, 17 VS, 16 S; 210/65, 70, 71, 73, 59, 152, 177, 180; 260/627 R, 627 G; 202/174; 203/11, 37, 41, 42

[56] References Cited
UNITED STATES PATENTS

| 3,546,078 | 12/1970 | Kahre et al. .................... 260/627 R |
| 2,088,817 | 8/1937 | Shoeld .......................... 260/627 R |
| 2,056,748 | 10/1936 | Taylor ........................... 260/627 R |
| 2,343,165 | 2/1944 | Adler ............................ 260/627 R |
| 2,786,082 | 3/1957 | Klockman ........................... 23/263 |
| 3,299,942 | 1/1967 | Jacoby ......................... 159/47 WL |

*Primary Examiner*—Charles N. Hart
*Assistant Examiner*—Peter A. Hruskoci
*Attorney, Agent, or Firm*—Merriam, Marshall, Shapiro & Klose

[57] ABSTRACT

Effluents containing phenols and ammonium salts, e.g., from coke ovens, are purified by adding alkali to release ammonia from the ammonium salts with strong acids, partially evaporating the mixture to remove volatile constituents, incinerating the vapours so produced, evaporating the remainder to produce vapour which is scrubbed with alkali to remove phenols and concentrate which is incinerated.

5 Claims, 2 Drawing Figures

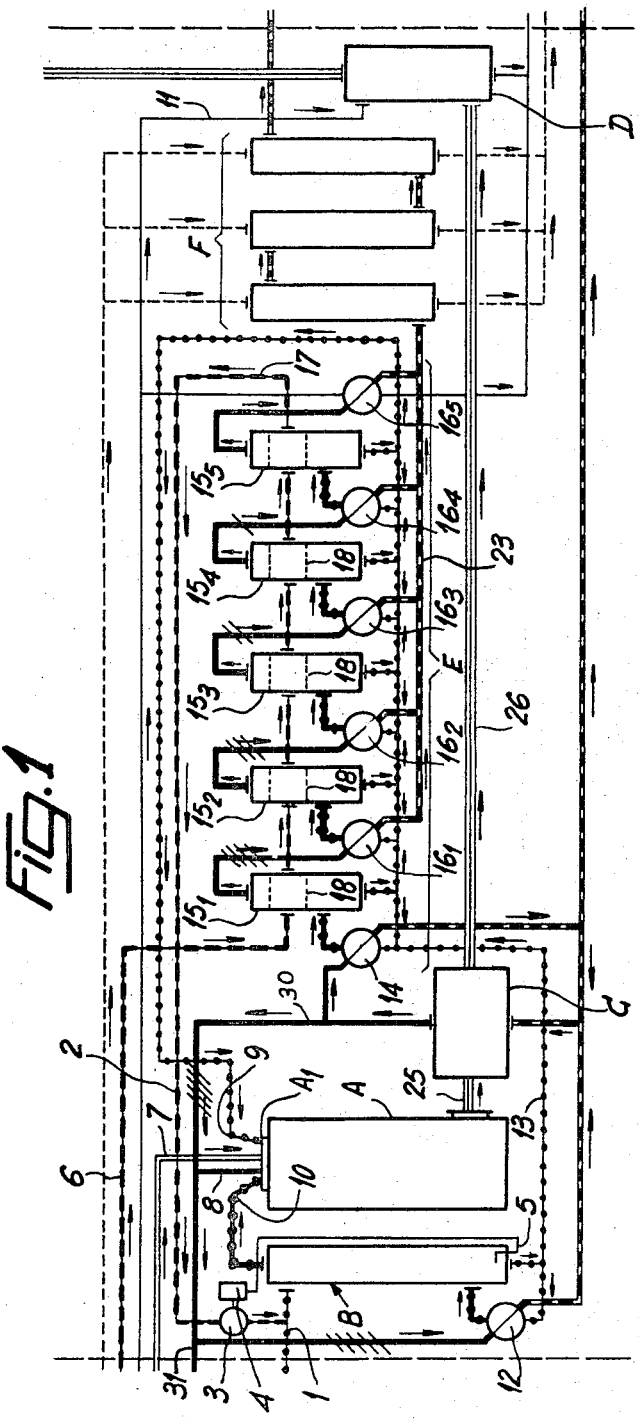
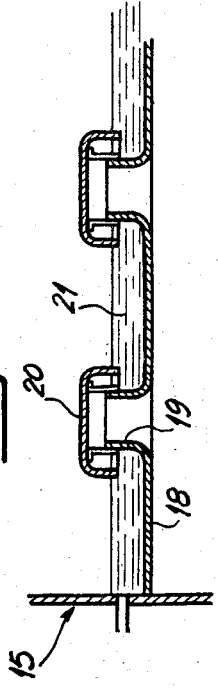

PROCESS AND DEVICE FOR PURIFICATION OF EFFLUENTS CONTAINING PHENOLS AND AMMONIUM SALTS

The present invention relates to the purification of effluents containing phenols and ammonium salts especially those derived from coking plants.

One conventional process for the treatment of an industrial aqueous effluent consists of incinerating the effluent by feeding it into a furnace via a burner using liquid fuel, which vaporises the water and is hot enough to destroy the noxious components which it contains. The heat produced is usually recovered in a boiler producing steam for various uses.

The direct treatment of effluents from coking plants by this process is not economical. To incinerate all such effluents would involve a prohibitive consumption of fuel, except in those rare cases where a use can be found for the large excess of steam which would be produced. This is essentially because such effluents have a large volume but contain relatively low concentrations of substances to be removed.

However, since these substances, and especially the phenols which constitute part of them, destroy organic enzymes, it is not possible to rely on a biodegradation of the pollutants of the effluents from coking plants for natural purification of these effluents. A special treatment is thus necessary.

Concentration, for example by distillation, of the effluent to reduce the volume of liquid to be incinerated does not appear to be economically advantageous, because the effluents from coking plants contain some pollutants such as ammonia and certain phenols, which are volatile with water, and are thus found both in the vapour and in the concentrate, with the result that both the concentrate and the vapour would still have to be incinerated.

The present invention provides a solution to this problem by making it possible to increase the concentration of pollutants in the liquid to be incinerated to such an extent that the cost of the treatment equipment on the one hand, and the cost of using it on the other hand, remain within economically acceptable limits.

The process of the invention for the purification of an effluent containing phenols and ammonium salts comprises adding sufficient caustic alkali to the said effluent to convert the ammonium salts with strong acids into ammonia, partially evaporating the resulting liquid mixture to remove as vapour ammonia and other volatile constituents, incinerating the vapour thus produced, evaporating the remaining liquid to produce vapour and a concentrate, scrubbing the vapour so obtained with a solution of caustic alkali, incinerating the concentrate and discharging the scrubbed vapour and the products of the incineration.

In effect, since all the volatile components and especially ammonia are removed by the preliminary treatment, the liquid which is concentrated by evaporation contains only phenols as volatile products, which, when vaporised, are held back by the scrubbing with caustic alkali solution. Thus the condensate from the evaporation is only practically pure water and only the final concentrate containing the greater part of the impurities needs to be incinerated.

To limit the amount of caustic alkali, generally sodium hydroxide solution, used, the addition of alkali to the effluent preferably is limited to the amount required to neutralise the effluents, that is to say in general the amount required to displace the ammonia bound by strong acids. The ammonium salts of weak acids are volatile and are thus also removed in the initial partial evaporation.

The sodium hydroxide or other caustic alkali solution initially added to the effluent is preferably that previously employed for scrubbing the distillation vapours. Preferably, the evaporation apparatus is of the multistage type and the caustic alkali solution for scrubbing passes from one stage to another of this device and is finally conveyed back to the effluent inlet for mixing with the latter in the manner already described.

Thus, the phenols, which tend to evaporate during the distillation, are held back at each stage by the sodium hydroxide solution and are conveyed back to the effluent inlet so that they finally end up in the liquid concentrate fed to the incinerator.

In the evaporation, the effluent is preferably reduced to about a tenth of its initial volume, so that the incineration furnace needs only to have a tenth of the heating power of the furnace which would be necessary if all the effluent from the coking plant had to be incinerated. Since the furnace is the most expensive component to construct and use, the invention makes it possible to treat effluents under advantageous conditions. Moreover, the size of the furnace and its heat capacity can be chosen so that the steam produced can supply the heat required for the removal of volatile substances in the initial partial evaporation and for the evaporation of the remainder of the liquid.

The invention includes within its scope a device for carrying out the invention comprising an incineration furnace, a steam boiler heated by the heat from this furnace, a column for partial evaporation to receive effluent after it has been rendered alkaline, a duct to convey the vapours from the said column to the incineration furnace, a multi-stage device for evaporating the liquid from the said column, comprising, in each stage, means for scrubbing the vapours produced by bubbling them through a solution of caustic alkali, and a duct for conveying concentrate from the said multi-stage evaporation device to the incineration furnace.

A device of this kind is shown diagrammatically in the accompanying drawings in which:

FIG. 1 is a diagram of the whole of an installation for the treatment of effluents from a coking plant;

FIG. 2 shows a detail of a device for scrubbing the vapours of one of the distillation cells.

In the installation illustrated schematically in FIG. 1, the following notation has been used for clarity:

the pipelines for pure steam are represented by thick continuous lines, and the number of bars which cross them gives the relative order of magnitude of pressure which prevails therein (the higher the pressure, the greater the number of bars), the pipelines for pure or practically pure water are represented by a thick broken line between two fine lines, the contaminated water which is intended finally to be incinerated is represented by a fine line with a superimposed row of dots, the circuit of the sodium hydroxide solution is represented by a fine line with superimposed dashes, the path of the non-condensible fumes is represented by three parallel fine lines, the path of the river water which returns to the river is represented by a single fine line, the inlet for liquid fuel is represented by two parallel fine lines, and the path of the charcoal used for the final purification of the condensed water from the multi-stage evaporator is represented by a line of dashes.

In general, this installation comprises an incineration furnace A which can be of the vertical type and can contain the burner $A_1$ at its top. In addition to the fuel which is fed via the pipeline 7, this burner receives the vapour for spraying this fuel via a pipeline 8, the liquid to be incinerated via the pipeline 9, and finally, via a pipeline 10, contaminated vapour (to illustrate this fact, this pipeline is represented in the form of a thick line broken by dots) which comes from the column B.

The products issuing from the furnace A feed a boiler C, the fumes of which are washed in a device D with river water coming from the pipeline 11.

Finally, to concentrate the liquid to be incinerated, this installation comprises a multiple stage evaporator E, with five steps in this particular case, and an installation F for the final purification, by means of active charcoal, of the water produced.

To describe the installation in more detail, it will be supposed that it is intended for the treatment of effluents from a coking plant, the average hourly output of which is about 20,000 kg.

The concentration of pollutants in this water is only about 1.5 percent by weight and in the approximately 20 m³ of water discharged per hour, the quantity of pollutant constituents in kg, may, for example, be as follows:

| | |
|---|---|
| Free $NH_3$ | 46.0 |
| $NH_4Cl$ | 159.0 |
| $NH_4NO_3$ | 2.6 |
| $(NH_4)_2SO_4$ | 18.7 |
| $(NH_4)_2S$ | 19.4 |
| $NH_4CN$ | 0.3 |
| $(NH_4)_2CO_3$ | 4.8 |
| Metals | 0.2 |
| Phenols | 59.3 |
| Pyridines | 0.2 |
| Insoluble materials | 0.5 |

The effluent fed via pipeline 1, is first mixed with sodium hydroxide solution, coming from the pipeline 2, in an amount which corresponds exactly to the displacement of ammonia from the salts of strong anions ($Cl^-$, $SO_4^=$ and $NO_3^-$) without acting on the phenols, phenates and ammonium salts of weak anions ($CO_3^=$ $S^=$, $CN^-$ and the like).

This addition is carried out by means of the metering pump 3, the output of which is adjusted automatically by the adjusting device 4 which is controlled by a pH-measuring electrode 5, as explained below.

The sodium hydroxide solution, at a concentration of about 50 percent, brought from outside via the pipeline 6, is in this example, consumed at the rate of 263.2 kg per hour.

In this way, the effluent, at the inlet to the column B, now contains (in kg per hour):

| | |
|---|---|
| Free $NH_3$ | 101.9 |
| NaCl | 174.0 |
| $NaNO_3$ | 2.7 |
| $Na_2SO_4$ | 20.1 |

The other constituents of the above list, starting from the ammonium cyanide, remain unchanged.

In column B, the mixture which has been rendered alkaline is boiled directly, under atmospheric pressure, by the vapour coming from boiling vessel 12 which is supplied with pure steam at a high pressure, either by the boiler C (pipeline 30), or, when starting up, via an external pipeline 31 connected to the above. In this column B, the said mixture rains down in contact with the vapour.

The purpose of the stripping thus carried out is:

to remove practically all the free or liberated ammonia from the vapours, to disassociate the weak ammonium salts (phenates, carbonates, carbamates, cyanides and sulphides), the constituents of which (except for a part of the phenols) are carried away by the steam, to carry away the most volatile constituents (light hydrocarbons, light phenols and the like), and to ensure chemical equilibria leading to compounds which are stable to heat and which will make it possible to distil the remaining liquid without decomposition.

At the foot of the column, when the equilibria have been achieved and the ammonium salts have been entirely removed, the pH of the liquid should be approximately 7. The electrode 5 already mentioned makes it possible to check this pH and consequently to adjust the introduction of sodium hydroxide solution.

In column B, about 5 percent of the effluent treated passes into the vapour state.

For the other constituents, the compositions by weight per hour are given in the following table:

| | Top of the column (vapour) | Foot of the column (liquid) |
|---|---|---|
| $NH_3$ | 113.4 | traces |
| NaCl | — | 174.0 |
| $NaNO_3$ | — | 2.7 |
| $Na_2SO_4$ | — | 20.1 |
| $H_2S$ | 9.7 | — |
| HCN | 0.2 | — |
| $CO_2$ | 2.2 | — |
| Metals | — | 0.2 |
| Phenols | 9.3 | 50.0 |
| Pyridines | 0.1 | 0.1 |
| Insoluble materials | — | 0.5 |

The neutral liquid leaving the foot of the column B via the pipeline 13 is conveyed to the first stage of the five stage evaporator E. In the practical embodiment example given, this evaporator operates under 5 bars absolute and it is heated with steam under 12 bars gauge, this being steam which is applied to the boiling vessel 14 placed at the beginning of the evaporator.

In a manner which is in itself known, the vapour collected at the top of each of the separators $15_1$ to $15_5$ of the evaporator is conveyed to heat exchangers $16_1$ to $16_5$, and the vapour which it produces is conveyed to the bottom of the separator of the following stage. In the last exchanger ($16_5$), the vapour produced is simply condensed by the stream of river water which passes through this exchanger via the pipeline 17.

Before issuing from each of the separators, the vapours emitted are brought into contact with sodium hydroxide solution which, coming from the pipeline 6, passes successively through each of these separators before being taken up again by the pump 3 in order to be added to the effluent. This contact is achieved in the manner shown in FIG. 2.

Each separator comprises at least one horizontal plate 18 through which the vapour passes via shafts 19. Each shaft is covered by a bell-shaped bubble cap 20, the base of which is immersed in the layer of sodium hydroxide solution 21 which the plate carries. Thus, the vapour is forced to bubble through this sodium hydroxide solution before issuing from the separator. The sodium hydroxide solution can advantageously pass from one plate to another via suitable means. This contact between the vapour and the sodium hydroxide solution holds back the phenols which have been vaporised or carried away by this vapour from the distilled neutral solution.

It can be estimated that the phenols which are thus carried away and which, by the pump 3, are recycled to the effluent represent 15% of the total.

In the case of a five stage evaporator, as in the embodiment described, the following table give figures for the operating conditions:

| Stages | 1 | 2 | 3 | 4 | 5 |
|---|---|---|---|---|---|
| Temperature (°C) | 152 | 127 | 100 | 81 | 55 |
| Pressure (bars) | 5 | 2.5 | 1 | 0.50 | 0.16 |
| Amount of water vaporised in % of the total | 13 | 16 | 19 | 20 | 22 |
| Amount of phenols vaporised and held back by the sodium hydroxide solution (in kg per hour) | 0.2 | 0.3 | 0.4 | 0.5 | 0.6 |

Thus, in practice, the 50 kg of phenols which the effluent discharges every hour, are to be found, together with all the sodium salts (196.8 kg), metals, pyridines and other insoluble constituents, in an amount of liquid which is of the order of 10 percent of the original amount of effluent (that is to say, per hour, an amount of the order of 2,000 litres), whilst the pipeline 23 collects, at the outlet of the exchangers $16_1$ to $16_5$, about 90 percent of the effluent in the form of almost pure, crude distilled water, that is to say water which contains scarely more than 100 ppm of organic materials.

The final concentrate is conveyed, as already stated, via the pipeline 9 to the burner A.

The combustion temperature is advantageously of the order of 1,200°C. At this temperature, all the organic materials are completely converted into $CO_2$, $H_2O$, $N_2$ and so on. The combustible inorganic materials ($NH_3$, $H_2S$ and $HCN$) are also burnt to give $N_2$, $H_2O$, $SO_2$ and $CO_2$.

The sodium salts finally remain unchanged. They issue from the furnace A, in the vapour state or as fine droplets, via the fume stack. They can be collected, in a known manner, at the base of the boiler C in which the fumes are brought to a temperature of about 300°C for the production of steam.

More simply, because of their relatively small amount, they can be carried away by the fumes into the washing tower D and removed by scrubbing in the latter. The fumes are then conveyed to the scrubbing tower D via the pipeline 26 and are condensed therein by mixing with river water.

The crude distilled water is purified; arriving via the pipeline 23, it is treated continuously in the device F. This purification can be carried out in a fixed bed on active charcoal or other suitable absorbent. The final content of organic impurities can be reduced finally to a few ppm.

For the discharge rate envisaged, the consumption of charcoal is 8 kg per hour. The spent charcoal can be mixed with the fine coal intended for coking.

I claim:

1. A method for continuously destroying polluting components of waste water, namely effluents from coke ovens, containing among other impurities phenolic materials, ammonia and ammonium salts of various acids, including strong acids, which comprises:
   continuously adding an aqueous solution of caustic alkali to the waste water to substantially neutralize the same and to convert ammonium salts of strong acids in the waste water into ammonia and neutral salts;
   stripping the neutralized waste water to separate volatile constituents in the gaseous state;
   continuously stage distilling the stripped waste water and scrubbing the vapor from each stage with an aqueous solution containing caustic alkali;
   continuously supplying an aqueous solution of caustic alkali to the first stage of the distillation process and circulating said caustic alkali solution from said first stage through each stage to the last one to provide the scrubbing solution and then feeding the caustic alkali solution from the last stage to entering waste water for neutralizing the same as called for in the first step;
   condensing and discharging said scrubbed vapor from the distilling stages; and,
   continuously and simultaneously burning said volatile constituents released in the neutralization step and the concentrate resulting from said distillation step.

2. A method according to claim 1 wherein heat continuously produced by burning the volatile constituents and the concentrate is used for producing vapor for stripping the neutralized waste water and stage distilling the stripped waste water.

3. A method according to claim 1 in which the vapor condensed to a liquid is passed in contact with activated carbon before discharging said liquid.

4. A method according to claim 1 wherein heat for stage distilling the stripped waste water is limited to vaporize about nine-tenths of said waste water whereby the volume of the concentrate to be burned is about one-tenth of the volume of the initial waste water.

5. A method according to claim 1 wherein the caustic alkali of the aqueous solution is sodium hydroxide.

* * * * *